H. C. CHRISTIANSON.
METHOD OF SUGAR MANUFACTURE.
APPLICATION FILED JAN. 13, 1910.
968,327.
Patented Aug. 23, 1910.
4 SHEETS—SHEET 4.
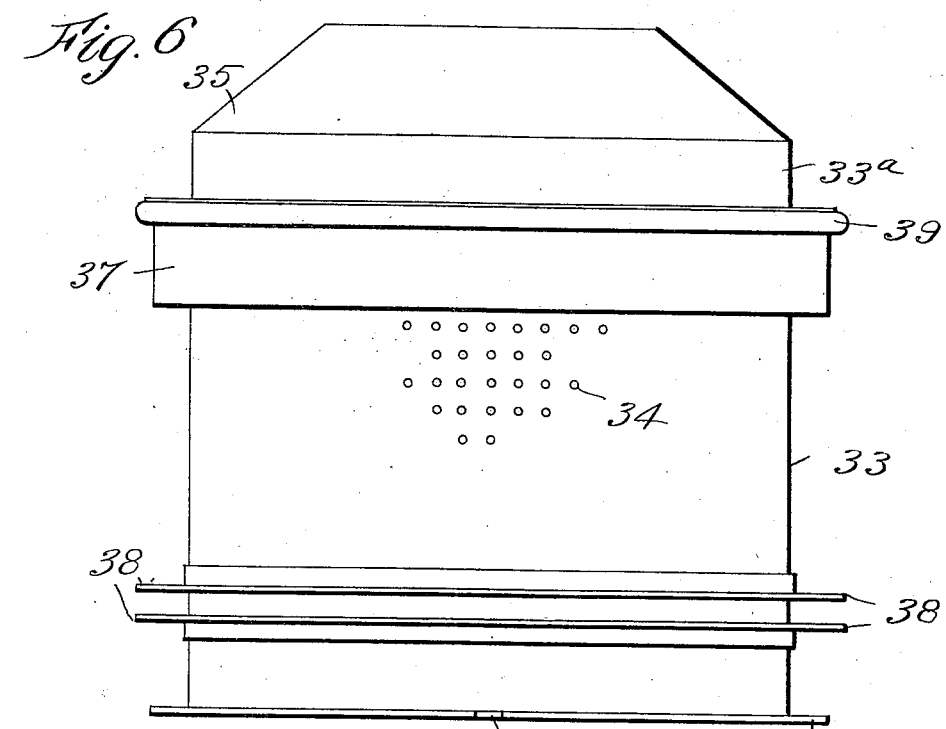
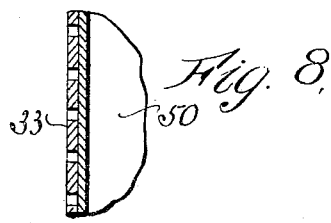
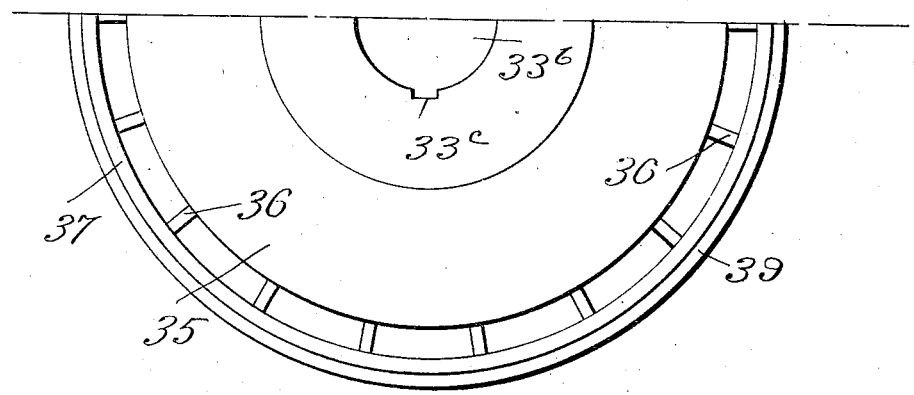
Witnesses:
Clara Hohenstein
Henry C. Workman
Inventor
Harry C. Christianson
By his Attorney

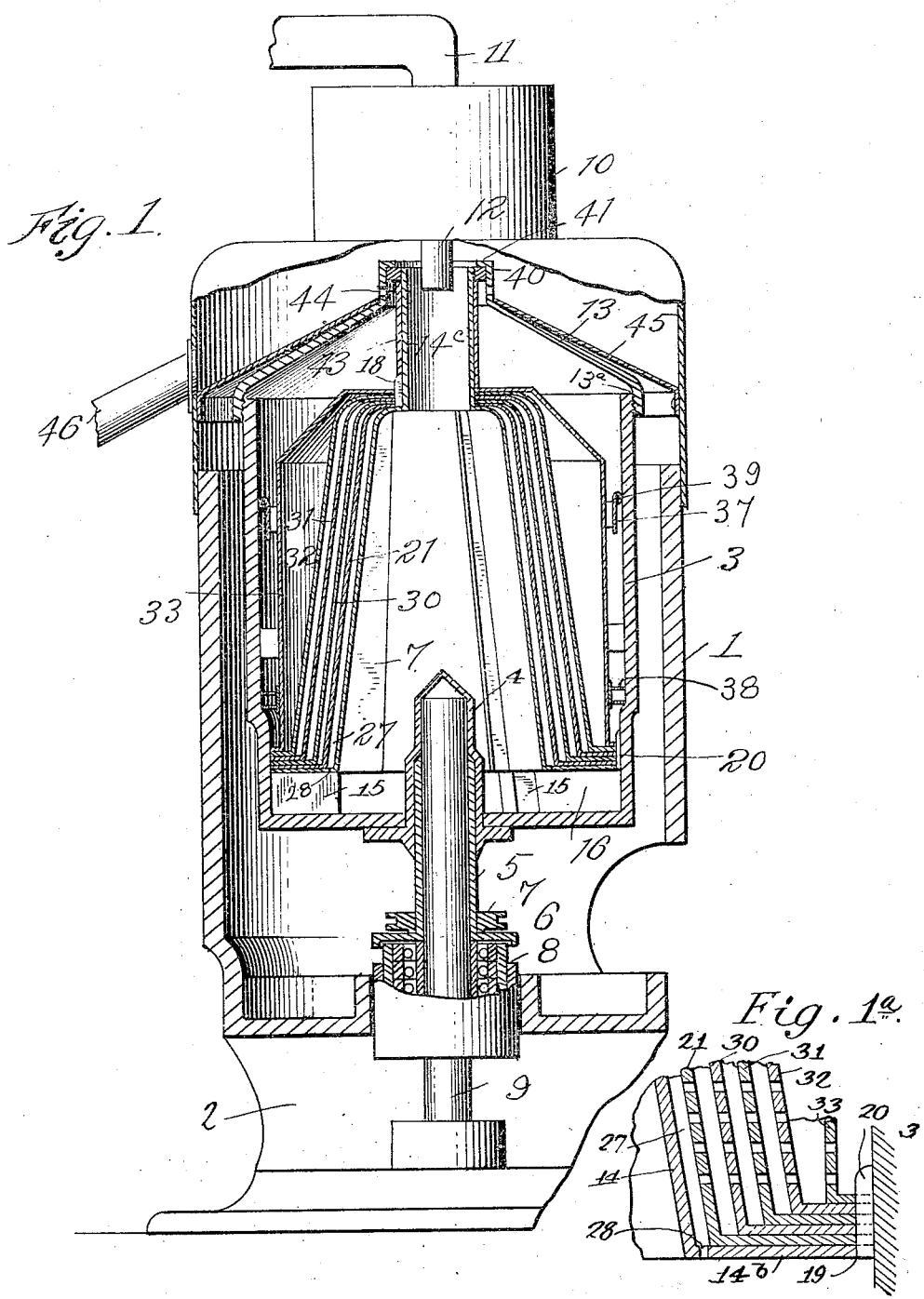

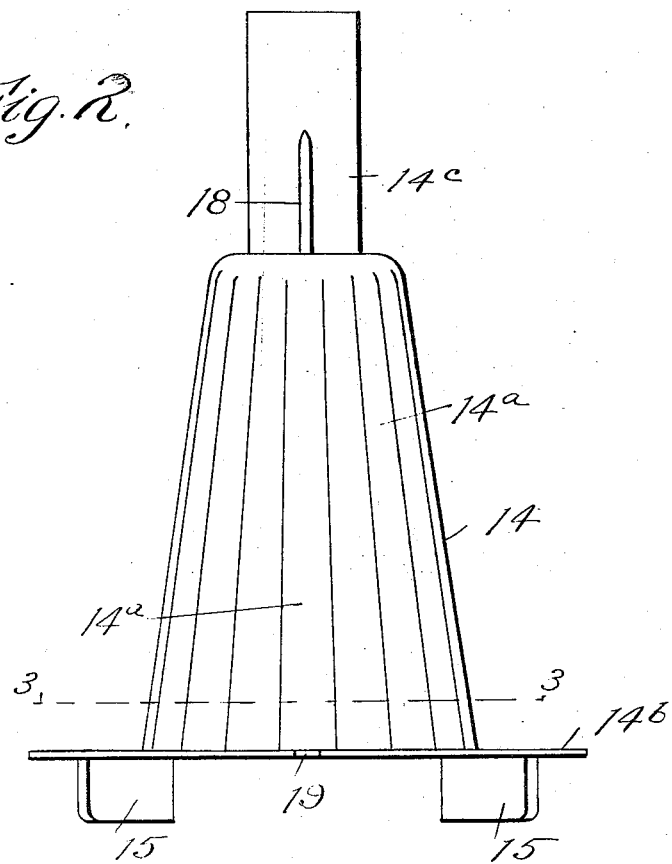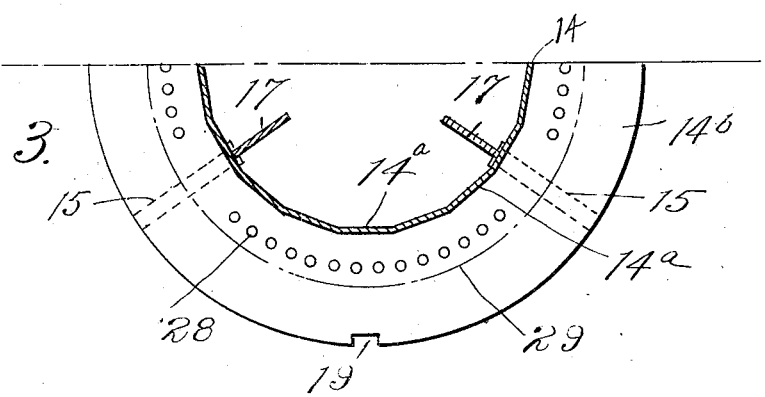

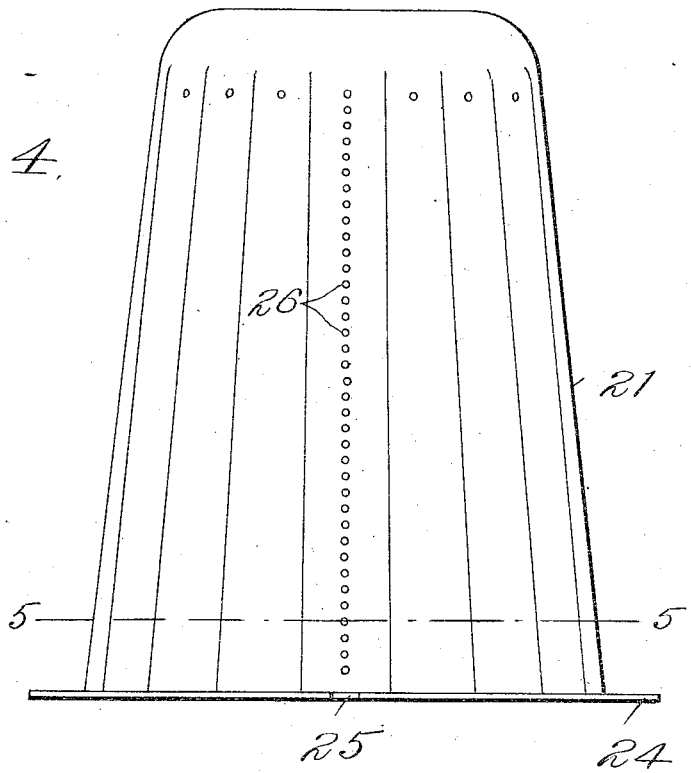
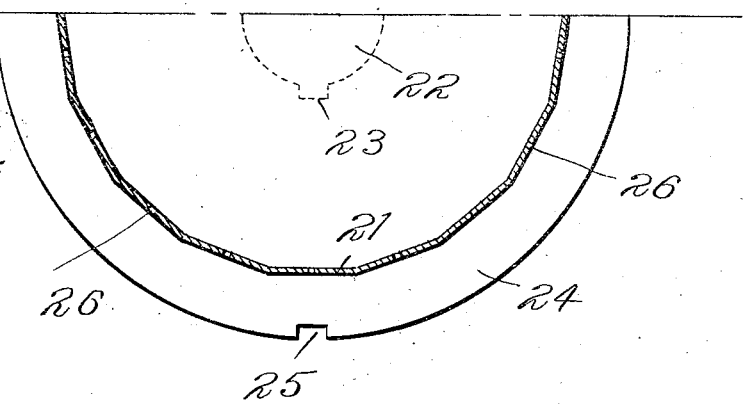

UNITED STATES PATENT OFFICE.

HARRY C. CHRISTIANSON, OF FANWOOD, NEW JERSEY.

METHOD OF SUGAR MANUFACTURE.

968,327.   Specification of Letters Patent.   Patented Aug. 23, 1910.

Application filed January 13, 1910. Serial No. 537,904.

*To all whom it may concern:*

Be it known that I, HARRY C. CHRISTIANSON, a citizen of the United States, and resident of Fanwood, in the county of Union and State of New Jersey, have invented certain new and useful Improvements in Methods of Sugar Manufacture; and in order that others skilled in the art may understand and practice my invention I give the following description and specification thereof, reference being had to the accompanying drawings, which form a part of the specification.

My invention relates to the production of sugar from sugar solutions of all kinds including syrups, molasses, honey and the like, and to the purification of such solutions, syrups and the like; and it has for its object to provide a method of treatment, particularly of sugar solutions, whereby a much higher yield of sucrose or sugar is obtained as well as a decrease in the invert or non-crystallizable sugars, and at the same time to obtain a greater purity of sugar product than is obtained by present methods, and whereby other advantages hereinafter specified are obtained.

Crude sugar solutions such as produced from the sugar cane by crushing and extracting the juice show upon analysis certain percentages of sucrose and of impurities such as invert sugar, ash, salts, gums, fiber, pith, etc. The sugar and molasses obtained from such solutions by the usual defecation and concentrating processes show by analysis, however, a larger percentage of impurities and less sucrose than the original sugar solution contained. This is particularly true of the molasses in which the percentage of invert sugar and other impurities is greater than the proportion in the crude solution; and the sucrose itself is also found to contain a certain amount of impurities which tend to deteriorate it even after refining. Thus a considerable loss of sugar is occasioned and the proportion of impurities increased,—the presence of which, moreover, tends to favor inversion and still further lessen the yield of sugar. Up to the present time, so far as I am aware, it has not been attempted to remove these impurities and indeed their existence for the most part has not been suspected, for the reason that they are present in such a fine state of subdivision or suspension and are of such a character that they pass through the finest filters or separating media which will admit the solution. I have discovered, however, that by subjecting the crude solution and also the molasses to treatment according to my invention that practically all these impurities may be removed, and important and beneficial results obtained. The resultant sucrose yield is not only considerably increased thereby, but the sucrose obtained shows a much greater degree of purity, and in addition material saving and advantages are also obtained in the various refining steps or processes performed to recover the sugar; that is to say, in the steps of evaporation, filtering, boiling, clarifying and the like. The molasses obtained is also of a considerably greater degree of purity, and may be boiled repeatedly and a larger yield of both second and third sugars secured.

As a result of treating sugar solutions according to my invention, not only is a larger yield of sucrose and a sucrose of greater purity obtained than is obtained in ordinary practice, but the solutions are preserved from fermentation and inversion and will therefore keep without deterioration, the heavier sugar solution remaining sweet indefinitely and requiring no addition of preservatives for that purpose. The marked increase in purity of the solution resulting from my invention has the effect that in evaporating the purified solution in what are known as the "effects"—double, triple or quadruple—the evaporation takes place more quickly and with the expenditure of less heat, leaving practically no scale on the evaporating tubes. Concentration and boiling to grain in the vacuum pans is therefore considerably shortened with a corresponding saving of heat. The increased purity of the solution obtained also further results in requiring less filtering material and filtration is quicker so that a saving in bone black or like filtering material is effected, owing to there being less impurities and coloring matter to be removed. The gum and similar impurities having been removed as a result of my invention the boiling in the vacuum pan also takes place more freely, and the time required for drying the sugar in the centrifugal machine is shortened. As the resulting molasses also contains less impurities than molasses as now produced, this product may be, as above stated, boiled repeatedly and a larger yield of second and third sugars obtained.

A suitable form of apparatus to be employed for carrying out the invention consists of providing a plurality of rapidly rotating chambers concentrically arranged, the walls of which taper so that the individual walls have different peripheral speeds at different portions thereof and also each wall has a different peripheral speed or speeds than its neighbor. The result produced is a graduated separation of the impurities in accordance with their respective specific gravities, the solution being caused to pass from the first chamber to the last chamber successively through the intervening chambers, the walls of the chambers being provided with holes or apertures to permit of the passage of the solution from one chamber to the next in succession. By this mode of treatment, the impurities, which are disseminated throughout the untreated solution, are displaced or thrown out progressively in the several chambers as the solution passes through them; the displaced or thrown out impurities, being retained by the walls of the chambers, are separated from the solution which passes on through the apertures in said walls. The solution is thus freed from the impurities and when it reaches the last chamber has parted with practically all of the impurities and is subjected to the greatest peripheral speed under which the remainder or last vestige of suspended impurities is removed.

The process will be more fully understood by reference to the form of apparatus shown in the accompanying drawings.

Figure 1 of the drawings represents a vertical sectional view of the apparatus. Fig. 1$^a$ is a detail view on enlarged scale showing the arrangement of the cones or walls. Fig. 2 represents an elevation of the inner cone. Fig. 3 represents a partial sectional view of the same taken on line 3—3 Fig. 2. Fig. 4 represents an elevation of one of the intermediate cones or walls, Fig. 5 represents a partial sectional view of the same taken on line 5—5 of Fig. 4. Fig. 6 represents an elevation of the outer separating wall or basket. Fig. 7 shows a partial plan view of the same. Fig. 8 is a fragmentary view of the basket or outer separating wall, showing the filtering medium in place.

In the several views of the drawings the same reference letters are applied to corresponding parts.

The apparatus as shown comprises an outer casing 1 supported upon a suitable base 2. Within the casing is mounted, to rotate rapidly, the receptacle or "bowl" 3. This bowl is provided with a central socket 4 which has a downward extension or sleeve 5 provided at its lower end with a flange 6 and a driving pulley 7. The lower end of the sleeve 5 is mounted to rest on a step bearing 8 which is preferably of the ball bearing type having a plurality of balls and ball races so as to reduce the friction to a minimum. The bearings 8 are suitably mounted in the base 2 of the machine. A spindle 9 is supported in the base 2 of the machine, and passes upwardly through the center of the bearings 8 and through the sleeve 5 and into the socket 4 of the bowl 3.

The upper part of the casing 1 is formed or provided with a reservoir or tank 10 into which the solution to be treated is delivered through a feed pipe 11. The reservoir 10 is provided with a central discharge outlet 12 which delivers the solution into the interior of the innermost chamber or cone, as will be explained below.

The receptacle or bowl 3 is provided with a cover 13 which engages the bowl by a screw threaded connection 13$^a$ so as to tightly inclose the same. Within the bowl or receptacle are arranged a series of diaphragms or partitions which, according to the form of apparatus shown in the drawings, are of a generally conical outline or form with their enlarged portions at the bottom and their narrowed portions at the top. In the form of apparatus shown I have illustrated six of such diaphragms or partitions, thereby providing a series of annular chambers within the bowl or receptacle 3. In order that the operation of the process may be more clearly understood, I will proceed to describe these diaphragms or partitions in detail. The innermost or central partition or cone is illustrated in Figs. 2 and 3, it consists of a generally tapered or conical shaped body portion 14, the periphery of which is preferably formed of a plurality of plane surfaces 14$^a$, so that its cross-section, as illustrated in Fig. 3, is polygonal in outline. This body portion 14 is extended outwardly at the bottom to form a flange 14$^b$ which makes close contact with the interior wall of the receptacle or bowl 3. To the lower side of this flange are secured lugs 15 to support the same at a distance above the floor or bottom of the bowl or receptacle 3. These lugs are three in number, although any number may be employed, arranged equidistant around the flange. By this arrangement there is formed between the flange $14^b$ and the bottom of the bowl 3 a space 16 which is continuous with the interior space of the cone 14. On the interior of the inner cone 14 are provided baffle plates 17 which in the device shown are three in number arranged equal distances around the inner wall of the inner cone. As shown in Fig. 1 these baffle plates taper from the bottom up, being wider at the bottom. The upper portion of the inner cone 14 is formed with a neck $14^c$ which forms a tubular extension thereto. This neck portion is provided with a lug or key 18 and the horizontal flange $14^b$ has formed in its periphery a notch 19, the purposes of which will hereinafter appear. In setting up the machine after the bowl has been placed in position on its bearings and spindle the innermost cone or partition 14 is placed within the same with its lugs or feet 15 resting on the bottom of the bowl and its flange $14^b$ making close contact with the side walls of the bowl. The next succeeding partition wall or cone is then superposed upon the first or inner cone 14, the neck $14^c$ of which threads through an opening in the top of the second cone. The flange $14^b$ of the inner cone engages, by means of its notch 19, with a lug or key 20 formed on the inner wall of the bowl 3, whereby the bowl and the inner cone are firmly held and locked together. This second cone or partition 21 is illustrated in Figs. 4 and 5 of the drawings. It is provided in its top with an aperture or opening 22 having a key way or notch 23 therein for engagement with the key 18 on the neck portion $14^c$ of the cone 14, it being understood that this second cone 21 is threaded over said neck portion and its flange 24 formed at its lower edge resting on the flange $14^b$ of the first cone, as shown in Fig. $1^a$. The flange 24 of the second cone is also provided with a notch 25 for engagement with the key or lug 20 on the inner wall of the bowl.

The general shape and form of the second cone 21 is similar to that of the first cone 14 in that it has a series of plane sides forming in cross-section a polygon, as illustrated in Fig. 5, but it differs from the first cone in that in each of its plane surfaces it is provided with a series of apertures or perforations 26 arranged centrally of each of said surfaces. For convenience these holes or perforations are shown only in one of the plane peripheral surfaces, but it is to be understood that the same are provided in each of said surfaces. The diameters of this second cone are greater than those of the first or inner cone 14, so as to form an intermediate chamber or space 27. Communication between this space and the space 16 is provided by a series of openings or perforations 28 in the flange $14^b$ of the inner cone or partition 14. These openings 28 are arranged circumferentially in said flange and at such a distance from the inner edge thereof that they open into the space 27. This is more clearly shown in Figs. $1^a$ and 3, the outline of the second cone or partition being indicated by the broken line 29 Fig. 3. Three other cones, each of the same form and construction, and each successively larger in diameter than the second cone, are shown in Fig. 1, all superposed in the same manner, one over the other, and provided with the same locking notches, are threaded over the inner cone 14. These cones are indicated respectively in Fig. 1 by the numerals 30, 31 and 32. As they are of the same form, construction and arrangement as the partition or cone 21, further detailed description thereof is unnecessary, except possibly to state that each forms an intermediate space or chamber between it and the cones inside and outside thereof. While I have illustrated five in all, of such cones or partitions, it will be understood that any desired number, more or less, may be employed forming a greater or less number of intermediate chambers or spaces according to the character of solution to be operated upon, and according to the different kinds or number of impurities the solution may contain. Surrounding and inclosing the cones is an outer "basket" 33, which is shown in detail in Figs. 6 and 7. As shown in the drawings this basket is more nearly cylindrical in shape with its top portion 35 tapered and provided with a central opening $33^b$ for threading over the neck portion $14^c$ of the inner cone. This opening $33^b$ is provided with the notch $33^c$ for engagement with the key or lug 18 on the neck of the inner cone and the lower flange $33^d$ is also provided with a notch $33^f$ for engagement with the lug 20 on the inner wall of the bowl in the same manner as the cones 14 and 21 are provided. The side walls or periphery of the basket 33 are perforated throughout their extent with holes or openings 34, as indicated in Figs. $1^a$ and 6, where for convenience of illustration a portion only of which are shown. The upper portion or cap 35 of the basket is imperforate. Near the top and bottom of the cylindrical portion or wall of the basket 33 are provided a series of outwardly extending radial spacing lugs 36, to the outer extremities of which are secured the collars or rings 37, 38. On these rings rubber rings or gaskets 39 are stretched which make a close contact with the inner walls of the bowl 3 as shown in Fig. 1. It will be seen from the foregoing description that the basket and each of the cones are firmly secured to the bowl 3 so as to rotate therewith.

The bowl 3 is provided as before stated with the cover 13 which is screwed thereon, said cover tapering to a central neck portion 40 having an inwardly projecting flange 41 resting on a shoulder formed in the upper end of the neck portion 14$^c$. A spacing sleeve 43 is employed surrounding the neck portion 14$^c$ so that when the cover 13 is screwed in place the sleeve 43 will be pressed downwardly on to the upper portion of the basket and cones holding the same firmly down. In the neck portion 40 is provided a series of outlet openings 44 for the discharge of the purified solution, and a trough 45 is formed on the inside of the upper portion of the casing 1 to receive said liquid and conduct it to the discharge pipe 46 in the side of said casing. The outlet pipe 12 of the reservoir or tank 10 enters the opening in the top of the cover 13 and conducts the raw or unpurified solution to the interior of the inner cone.

It will be understood that the bowl is rotated rapidly by means of any suitable and convenient source of power which may be applied direct to the sleeve 5 of the bowl or transmitted thereto by pulley and belt connection. An electric motor may be employed which may be built in the machine or a turbine for operation by steam or water power may be arranged so as to form part of the machine, if desired, for as stated above power of any suitable prime mover may be transmitted to the bowl by means of belt or rope connection.

While I have shown the partitions or intermediate walls of the annular chambers as conical in shape it will be understood that while this is preferable and has been found to give good results in practice, this particular shape is not essential, but other shapes such as cylindrical, or cones of greater inclination, may be employed. By employing the conical shaped separating walls or partitions, the advantage is secured that different portions of the wall have different peripheral speeds, that is to say the lower portion of a cone being of greater diameter than the intermediate or upper portion will have a relatively greater peripheral speed and this will insure a more perfect separation since there is a tendency of the heavier portion of the impurities to settle at the bottom of the chamber and the purer portion of the solution to rise to the top, so that the lower and impure portion of the solution in a chamber receives the greater centrifugal effect, thereby insuring a better and more perfect separation of the impurities.

The speed of the cones or chambers formed thereby is an important feature of the invention in order to obtain the most perfect purification of the solution. I have found that speeds between the following specified limits give good results. The first or inner cone should travel at a speed of not less than 9800 feet per minute nor over 10250 feet per minute at its largest diameter; the second or next cone should travel at a speed of not less than 12950 feet per minute nor over 13700; the third cone should travel at a speed of not less than 13650 feet per minute and not more than 14300; the fourth cone should travel at a speed of not less than 14130 feet per minute nor over 14800; the fifth cone should travel at a speed not less than 15708 nor over 16500, and the sixth cone or basket should travel at a speed not less than 16100 feet per minute nor over 16900. The above figures are given in each case for the larger diameter of each cone, that is, the diameter at the base.

The operation of the device it is believed will be obvious from the foregoing description. When the machine is set up and the cones are in place a layer of filtering medium, such for instance as filter paper of thin variety, is placed around the interior of the basket over the perforations or holes therein. This filter paper is illustrated by the numeral 50 in Fig. 8 of the drawings. The cover 13 is screwed on in place and the cones are firmly held down and locked to the bowl. The solution is then admitted to the interior of the first or interior cone and the device may be then speeded up. When the proper working speed for the solution operated upon has been reached the feed of the solution may be continuous through the device. The solution immediately flows down and into the space 16 beneath the flange of the inner cone, and the only exit therefrom is through the series of holes 28 in said flange into the intermediate chamber 27 between the first and second cones. The centrifugal motion of the liquid in the inner cone is insured by the baffle plates 17. The solution finding its way into the first intermediate chamber 27 is subjected to varying peripheral speeds according as it rises in height in said chamber, and finding its way through the holes or perforations in the outer wall of said chamber into the next intermediate chamber between the second and third cones. It will thus be seen that the liquid is caused to pass in succession through the succeeding chambers until it reaches the outer cone or basket 33. The filter paper or filtering medium covering the apertures in the walls of this chamber tends not only to prevent the too rapid escape of the solution from said basket but also assists in purifying the liquid by arresting and straining out the finer particles or particles of lightest specific gravity from the solution. The liquid passing through the basket arises in the space between it and the inner wall of the bowl 3 and flows out through the openings 44 into a trough 45 on the inner side of the casing from which it flows out of the machine through the outlet pipe 46. It will thus be seen that the solution is caused to pass successively through a series of rapidly rotating chambers each of which in the form of apparatus shown has different peripheral speeds at different portions of its surface, and each chamber has the greatest peripheral speed where the denser or heavier portions of the solution and impurities tend to settle, and that this effect upon the solution is successively repeated in the succeeding chambers.

While in the form of apparatus described there are six cones or partition walls shown, it will be understood that the process is not limited to an apparatus having that number or any particular number of partition walls or chambers. The number of cones or chambers depends to some extent upon the number of different kinds of impurities or the number of different specific gravities which the impurities to be removed possess, as for instance where two impurities are to be removed, or impurities having only two different specific gravities, three cones would be sufficient and where more than two kinds of impurities are to be removed a greater number, more or less than six, would be employed, as the cones or chambers have the effect of separating or classifying the substances to a considerable degree, according to their respective specific gravities. The particular shape of the partition walls or cones shown in the drawings is not essential, but has been found to give good results.

It will be understood that my invention is not limited to sugar solutions from cane sugar, but may be advantageously employed for any kind of sugar solution however produced. In the beet sugar process the lime salts whether phosphate, carbonate, sulfate or sucrate of lime are removed from the solution, as well as all organic matter such as gum fiber and pith. The process may also be used upon honey from which it will remove the wax, gums or fiber or any foreign or insoluble substances contained or held in suspension therein. The process is also adapted for the manufacture of any kind of sugar whether beet, cane or vegetable sugar, and will separate at any specific gravity above water, including highly heated solutions that contain as high as eighty-five per cent. of solids, and is particularly adapted for substances running eighty per cent. and under of solids down to a substance or solution having the specific gravity of water.

A further important advantage of the invention consists in the removal of the invert sugar along with the other impurities and this removal taking place by the application of the process to the early stage of the treatment of sugar solutions for the production of sugar, prevents or arrests the inversion of the sugar, thereby resulting in an increased yield of sucrose.

What I claim is:

1. The process of purifying sugar and like solutions which consists in passing the solution through a series of rapidly rotating centrifugal chambers having successively increasing rates of speed, the rotary centrifugal action imparted to the solution by one chamber being continued and increased by the next, and succeeding chambers, and separating from the solution the impurities, suspended matter and the like displaced in the several chambers.

2. The process of purifying sugar and like solutions, which consists in passing the solution through a series of centrifugal separating chambers having successively increasing rates of speed, the rate of speed of each chamber increasing at different portions thereof, the speed imparted to the solution by one chamber being continued and increased in the next and succeeding chambers, and separating from the solution the impurities, suspended matter and the like displaced by each chamber.

3. The process of treating sugar and like solutions which consists in subjecting the solution to a continuous rapid rotary and centrifugal action, successively and progressively increasing said action, separating from the solution and collecting the impurities, suspended matter and the like displaced at each stage of increase of said action, and passing said solution at the final increase of said action through a fine filtering medium, whereby the solution is freed at each stage from the impurities which would tend to hinder the removal of impurities requiring the increased centrifugal action of a subsequent stage.

4. The process of treating sugar solutions and the like, which consists in subjecting the solution to a continuous rotary and centrifugal action of different and increasing speeds, said speeds ranging from substantially 9800 to substantially 16900 feet per minute, and separating from the solution the impurities, suspended matter and the like displaced at each increase of speed.

5. In the process of recovering sugar from solutions containing the same the step of subjecting the crude solution to a continuous series of centrifugal separating treatments to remove therefrom suspended impurities such as invert sugar, organic matter, salts, gums, fiber and the like.

6. The process of purifying sugar and like solutions, which consists in subjecting the solution to a continuous rotary centrifugal action of successively and progressively increasing speed, separating from the solution, at the different speeds, impurities such as invert sugar, organic and inversion producing matter, gums, phosphate and other lime compounds, and passing the solution at its greatest speed through a filtering medium.

7. The process of treating sugar solutions which consists in subjecting such solution to continuous and progressively increased centrifugal action or force, and progressively separating therefrom impurities, and finally passing the solution through a filtering medium.

HARRY C. CHRISTIANSON.

Witnesses:
CLARA HOHENSTEIN,
HENRY C. WORKMAN.